United States Patent [19]

Cole et al.

[11] 4,199,328
[45] Apr. 22, 1980

[54] PROCESS FOR PRODUCING METHANE FROM NAPHTHA

[75] Inventors: Edward L. Cole, Fishkill; John H. Estes; Robert M. Suggitt, both of Wappingers Falls, all of N.Y.

[73] Assignee: Texaco Inc., White Plains, N.Y.

[21] Appl. No.: 974,191

[22] Filed: Dec. 28, 1978

[51] Int. Cl.² .............................................. C10G 13/30
[52] U.S. Cl. .................................. 48/213; 252/455 Z; 585/752
[58] Field of Search ..................... 585/752; 48/213; 252/455 Z; 208/111

[56] References Cited

U.S. PATENT DOCUMENTS

| 3,130,007 | 4/1964 | Breck | 252/455 Z |
| 3,458,299 | 7/1969 | Hass | 48/213 |
| 3,839,477 | 10/1974 | Suggitt et al. | 260/668 R |
| 4,141,860 | 2/1979 | O'Hara et al. | 208/111 |

FOREIGN PATENT DOCUMENTS

| 2719724 | 11/1978 | Fed. Rep. of Germany | 208/111 |
| 51-28806 | 3/1976 | Japan | 48/213 |

Primary Examiner—S. Leon Bashore
Assistant Examiner—Peter F. Kratz
Attorney, Agent, or Firm—Robert A. Kulason; Carl G. Ries; Carl G. Seutter

[57] ABSTRACT

A method of and a catalyst for the conversion of petroleum distillate fractions to high heating value fuel gases suitable for use as town gas or pipeline gas by reacting a petroleum derived feedstock containing paraffins with hydrogen in the presence of a lanthanum-cobalt/Y zeolite catalyst at elevated temperature and pressure.

8 Claims, 1 Drawing Figure

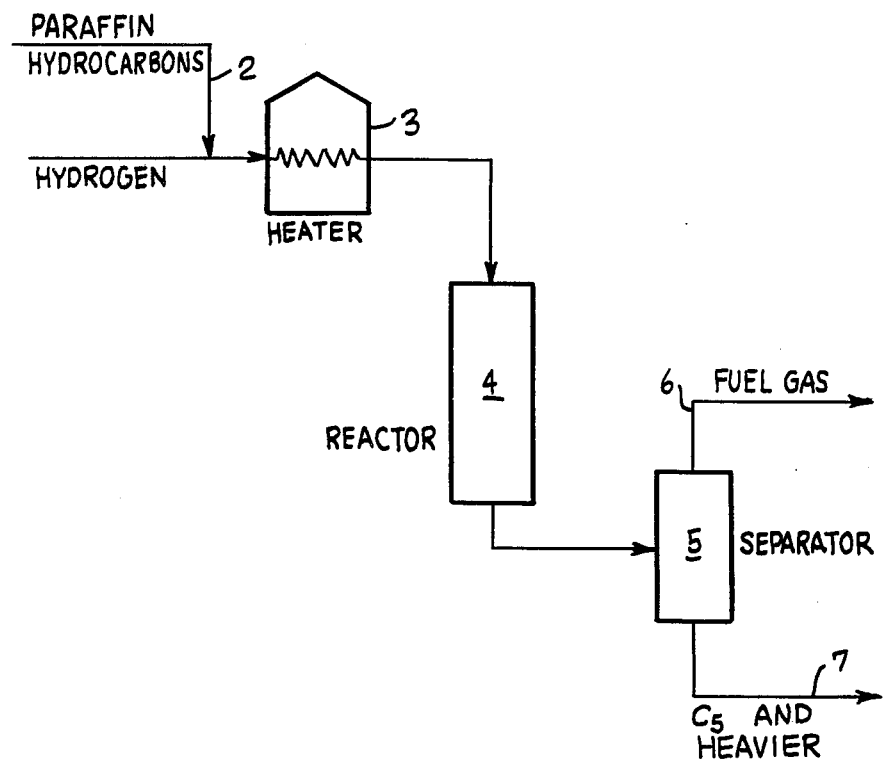

PROCESS FOR PRODUCING METHANE FROM NAPHTHA

This invention relates to a method of and a catalyst for the production of high heating value fuel gases in which a normally liquid petroleum distillate fraction is converted to a methane-rich fuel gas by reaction with hydrogen under elevated temperature and pressure in the presence of a lanthanum-cobalt/Y zeolite catalyst.

The energy pattern in the individual countries of the world is rapidly changing due to pressures brought on by increasing energy demand coupled with decreasing supplies of conventional energy sources and by environmental considerations. There is great demand for clean burning, readily transportable fuels, such as natural gas, in the chemical, metallurgical, and food industries and as a source of energy for power plants and for heating purposes. The supply of clean fuels, such as natural gas and low sulfur crude oils is limited. In many countries legislation severely limits the use of some of the more readily available fuels likely to cause atmospheric or thermal pollution. As a result, there is an increasing need for interchangeability of energy sources by the modern supplier of energy. Utilities have long provided energy to customers in different forms, e.g. electricity, fuel gas, high pressure steam, etc. Increasing amounts of power are now provided by nuclear energy which is converted to electrical energy or high pressure steam. Conversion of electrical energy to high heating value fuel gas or synthetic natural gas as a clean fuel for domestic and industrial use is less straightforward.

It has been proposed heretofore to convert electrical energy available from various sources, such as water power, nuclear plants, solar energy installations, and the like to hydrogen by the electrolysis of water to meet the energy demands of a future technological society. Hydrogen from water has been suggested as a potentially important fuel for the future because of its interchangeability with electrical energy and its ease of transportation by pipeline. The production of fuel gases by various catalytic reforming processes in which paraffin hydrocarbons are converted to cyclic compounds and by-product gases which are suitable as fuel gases is already known. It has also been proposed heretofore to produce methane and synthetic natural gas by the reaction of carbon monoxide with hydrogen in the presence of an iron group metal oxide catalyst.

In spite of the readily apparent advantages of hydrogen as a substitute for natural gas or as a fuel gas in its own right, there is a prejudice against the use of hydrogen in many instances where natural gas is now used, for example in domestic home heating uses, because of its potential hazards and the costs of conversion of consumer devices from natural gas to hydrogen. Additionally, the net or low heating value for hydrogen is roughly only 30 percent of the net heating value for methane, the principle constituent of natural gas.

The subject invention provides a method for catalytic conversion of hydrogen and liquid hydrocarbons to high heating value fuel gas. The process of this invention makes it possible to utilize hydrogen from any convenient source, such as electrolytic hydrogen, already mentioned, as well as hydrogen available by the partial oxidation of relatively poor fuels, such as lignite, petroleum coke, petroleum residua, solvent refined coal residues, shale oil, oil from tar sands, and the like, coupled with the water gas shift reaction to convert carbon monoxide to hydrogen. The process produces a fuel gas having a heating value more nearly approaching that of natural gas and is more efficient of total energy than processes which produce methane by reaction of hydrogen with carbon monoxide.

The process of this invention is particularly useful in areas, such as the northeastern portion of the United States and certain parts of the West Coast, where there are large peak demands for electrical energy interspersed with periods of relatively lower electrical power demand. In such situations, the electrical generation facilities can continue to generate electricity for the production of hydrogen which may be utilized in the process of this invention to produce a high heating value fuel gas that may be stored and supplied to the public upon demand. Thus, the proposed process provides a means for indirectly storing electrical energy as well as for providing fuel gas to customers. The process may also be used to provide peak demand shaving gas.

We have found that by passing hydrogen together with paraffinic hydrocarbons over a lanthanum-cobalt/Y zeolite catalyst at an elevated pressure and temperature, a methane-rich gas is secured that has a high heating value. The process of this invention is capable of complete conversion of paraffinic hydrocarbon distillates to gaseous fuels with minimum coke formation.

The FIGURE illustrates diagrammatically the process of this invention.

With references to the drawing, hydrogen from any suitable source, for example hydrogen produced by electrolysis of water from electrical energy available from a nuclear power plant, is supplied to the system through line 1 and admixed with a hydrocarbon feed stream rich in paraffins entering the system from line 2. The mixture of hydrogen and liquid hydrocarbon is heated to reaction temperature in heater 3 and introduced into a catalytic reactor 4 containing a novel catalyst comprising lanthanum and cobalt on a type Y zeolite support, suitably in the form of pellets. The reaction preferably is carried out in a downflow reactor of the trickle bed type in which at least part of the paraffin hydrocarbon feed is in liquid phase which trickles downwardly over the catalyst in the reactor wherein at least a partial conversion of the hydrocarbon feed charge stock to methane takes place, together with the production of smaller amounts of $C_2$ to $C_5$ hydrocarbons. The term "trickle-flow reactor" is well known in the art of catalytic hydrogenation and needs no further description.

The fuel gas product and unconverted hydrocarbons, if any, are discharged from the reactor to a separator 5 wherein $C_5$ and heavier hydrocarbons are separated from the fuel gas. The fuel gas, comprising hydrogen, methane, and a small percentage of hydrocarbons containing from 2 to 4 carbon atoms per molecule, is discharged through line 6 as product. Pentanes and heavier hydrocarbon liquids separated from the fuel gas in separator 5 are discharged through line 7 and may be used as fuel, or for the manufacture of chemicals, or for recycle to the reactor.

The catalyst utilized in the process of this invention comprises lanthanum and cobalt oxide on a type Y zeolite. Type Y zeolites are described in U.S. Pat. No. 3,130,007 incorporated herein by reference. A suitable catalyst comprises a type Y zeolite containing from 2 to 5 percent by weight lanthanum and 2 to 5 percent by weight cobalt and having a mole ratio of cobalt to lanthanum in the finished catalyst within the range to 0.5 to 5, preferably within the range of 1 to 3. The catalyst may be prepared according to the process described in U.S. Pat. No. 3,839,477, incorporated herein by reference, or by contacting a commercial Y zeolite catalyst containing lanthanum, e.g. Linde SK 500, with an aqueous solution of cobalt nitrate, followed by drying and calcining to produce a composition containing from about 2 to 5 percent by weight cobalt.

The conversion of hydrogen to methane is an exothermic reaction. Use may be made of the exothermic heat energy to preheat the charge stock to the reactor. The reaction may be carried out in a fixed bed or fluid bed reactor with means for removing heat from the bed or for cooling the reactants and reaction products between beds in a multi-bed reactor system. The zeolite catalyst may be deposited on the interior of small diameter tubes as set forth in U.S. Pat. No. 3,468,815 allowing precise temperature control as described in U.S. Pat. No. 3,182,086, incorporated herein by reference.

In the subsequent examples, Udex raffinate, a paraffin-rich hydrocarbon feedstock obtained by solvent extraction of aromatic hydrocarbons from a petroleum naptha fraction was employed for the production of fuel gas in accordance with this invention. The following inspection tests were obtained.

Table I

| Udex Raffinate - Composition and Physical Properties | | |
|---|---|---|
| Gravity, °API | | 61.3 |
| Bromine No. | | 2.4 |
| Sulfur, Wt. % | | 0.002 |
| Reid Vapor Pressure | | 1.1 bar (1.2 psig) |
| Nitrogen, Wt. % | | 0.0001 |
| ASTM Distillation | °C. | °F. |
| IBP-10% | 35.5/137 | (96/270) |
| 20-30% | 139/140.5 | (282/285) |
| 40-50% | 141.5/143 | (286/289) |
| 60-70% | 144.5/147 | (292/296) |
| 80-90% | 150.5/157 | (303/314) |
| 95-EP | 165/188 | (329/370) |
| Fluorescent Indicator Analysis, Vol. % | | |
| Aromatics | | 4.0 |
| Olefins | | 2.0 |
| Saturates | | 94.0 |
| High Mass Spectroscopic Analysis, Vol. % | | |
| Paraffins | | 91.5 |
| Cyclo-Paraffins | | 5.1 |
| Alkylbenzenes | | 3.0 |
| Indanes, etc. | | 0.4 |
| Carbon No. of Paraffins | | 9.0 |
| Carbon No. of Aromatics | | 9.3 |

EXAMPLE 1

A lithium-moderated, lanthanum-cobalt/Y zeolite catalyst was prepared by treating a commercial lanthanum containing type Y zeolite (Linde SK-500) with cobalt nitrate solution. To 300 grams of the zeolite which had been previously air dried at 315° C. (600° F.) and cooled to room temperature, 80 grams of cobalt nitrate ($Co(NO_3)_2 \cdot 6H_2O$) as a water solution was added. The mixture was dried at 60° C. (140° F.) and then heated successively at 149° C. (300° F.) for 2 hours; 315° C. (600° F.) for 2 hours; and finally, calcined at 760° C. (1400° F.) for 2 hours to convert the cobalt nitrate to cobalt oxide.

The resulting lanthanum-cobalt/Y zeolite was cooled and exposed to air overnight. The dried catalyst was then wetted with a solution comprising 50 grams of lithium acetate dissolved in 500 ml of water. The slurry of zeolite in lithium acetate solution was allowed to stand overnight and the excess solution drained off. The lithium-containing catalyst composition was dried at 149° C. and then calcined for two hours at 427° C. (800° F).

Analysis of the resulting catalyst indicated the following metals composition:
La (wt %): 3.6
Ce (wt. %): 0.40
Li (wt %): 0.41
Co (wt %): 4.3

The molar ratio of cobalt to rare earths in this composition was 2.53.

EXAMPLE 2

42g (60 ml) of the catalyst of Example 1 was packed into a reactor as a fixed bed. The catalyst was conditioned by heating to 538° C. (1000° F.) and holding at this temperature for two hours in a stream of molecular sieve dried hydrogen supplied to the reactor at the rate of 0.07 $m^3$/hr (2.5 SCF/hr). The reactor was cooled to 371° C. (700° F.), pressured with hydrogen to 14.8 bar (200 psig) and the hydrocarbon feed introduced at a rate of 60 ml/hr (1LHSV). Hydrogen flow was continued at a rate of 0.07 $m^3$/hr and the temperature raised to 427° C. (800° F.). After equilibrium was attained, a series of test runs were made. Data are summarized in Runs 1 to 3 of Tables II, III, and IV.

Table II

| | Hydrocarbon Feed Composition (Vol. %) | | |
|---|---|---|---|
| Run | Paraffins | Aromatics | Olefins |
| 1 | 95.0 | 4.5 | 0.5 |
| 2 | 92.5 | 7.0 | 0.5 |
| 3 | 94.0 | 5.0 | 1.0 |

Table III

| Run | Hc Feed Rate LHSV | $H_2$ Feed Rate $m^3$/kg | Reactor Temp °C. | Reactor Pres bar | Liquids Conversion % | Gas Yield $m^3$/kg | Heating Value* $MJ/m^3$ |
|---|---|---|---|---|---|---|---|
| 1 | 0.7 | 1.38 | 425 | 15.2 | 74 | 1.28 | 34.73 |
| 2 | 0.6 | 1.52 | 425 | 15.2 | 71 | 1.31 | 35.58 |
| 3 | 0.6 | 1.57 | 455 | 15.2 | 77 | 1.38 | 34.65 |

*After separation of $C_5$ and heavier hydrocarbons.

Table IV

| | Product Gas Composition (Vol. %) | | | | | |
|---|---|---|---|---|---|---|
| Run | $H_2$ | $C_1$ | $C_2$ | $C_3$ | $C_4$ | $C_5$ |
| 1 | 16.26 | 80.73 | 0.17 | 0.48 | 1.66 | 0.66 |
| 2 | 11.12 | 86.48 | 0.12 | 0.52 | 1.16 | 0.56 |
| 3 | 14.52 | 83.69 | 0.14 | 0.37 | 0.86 | 0.38 |

It will be noted that hydrogen, which has a heating value of 11.89 $MJ/m^3$ (319 BTU/SCF) was upgraded to fuel gas having a heating value of 34.65 to 35.58 $MJ/m^3$ (930 to 955 BTU/SCF). A fuel gas having a heating value of this magnitude is acceptable for commercial use and represents more than 190 percent increase in heating value over that of pure hydrogen.

EXAMPLE 3

A lanthanum-cobalt/Y zeolite catalyst was prepared by treating a commercial lanthanum-containing Y zeolite with an aqueous solution of cobalt nitrate. To 300 grams of Linde SK-500 that had been dried at 315° C. (600° F.), an aqueous solution of 80 grams of cobalt nitrate $(Co(NO_3)_2.6H_2O)$ was added. The material then slowly dried at 60° C. (140° F.); at 149° C. (300° F.) for 2 hours; at 315° C.(600° F.) for 2 hours; and finally, calcined at 760° C. (1400° F.) for 2 hours.

Analysis of the dried catalyst indicated the following metals content:
La (wt %): 3.6
Ce (wt %): 0.40
Co (wt %): 4.7

The molar ratio of cobalt to rare earths in this catalyst was 2.77.

EXAMPLE 4

Using the lanthanum-cobalt/Y zeolite catalyst of Example 3, the paraffin-rich hydrocarbon feed stock of Table I was given a mild hydrogenation treatment to convert the olefins contained in the feedstock to normal paraffins. A reactor containing 100 ml (70 g ) of the catalyst was used in this example. The hydrogenation carried out with a hydrocarbon liquid hourly space velocity (LHSV) of 1 and a hydrogen feed rate of 0.113 $m^3/hr$ (4 SCF/hr) at a temperature of 149° C. (300° F.) and a pressure of 34.5 bar (500 psig). The results are listed in Table V:

Table V

| Components | Fluorescent Indicator Analysis, Vol. % | |
|---|---|---|
|  | Charge | Product |
| Aromatics | 4.0 | 3.0 |
| Olefins | 2.0 | 0.5 |
| Saturates | 94.0 | 96.5 |
| Mole % $H_2$ in Off Gas | — | 99.8 |

The resulting treated hydrocarbon feedstock was reacted with hydrogen in the presence of the lanthanum-cobalt/Y zeolite catalyst of this example under the conditions and with the results shown in Tables VI, VII and VIII as Runs 4 and 5.

Table VI

| Run | Hydrocarbon Feed Composition (Vol. %) | | |
|---|---|---|---|
|  | Paraffins | Aromatics | Olefines |
| 4 | 96.5 | 3.0 | 0.5 |
| 5 | 96.5 | 3.0 | 0.5 |

Table VII

| Run | Hc Feed Rate LHSV | $H_2$ Feed Rate $m^3/kg$ | Reactor Temp °C. | Reactor Pres bar | Liquids Conversion % | Gas Yield $m^3/kg$ | Heating Value* $MJ/m^3$ |
|---|---|---|---|---|---|---|---|
| 4 | 0.45 | 2.52 | 370 | 35.5 | 100 | 2.60 | 28.75 |
| 5 | 0.45 | 2.50 | 400 | 35.5 | 100 | 2.60 | 29.25 |

*After separation of $C_5$ and heavier hydrocarbons.

Table VIII

| Run | Product Gas Composition (Vol %) | | | | | |
|---|---|---|---|---|---|---|
|  | $H_2$ | $C_1$ | $C_2$ | $C_3$ | $C_4$ | $C_5$ |
| 4 | 37.4 | 60.0 | 0.55 | 0.57 | 1.02 | 0.40 |
| 5 | 36.4 | 21.26 | 0.48 | 0.53 | 0.94 | 0.37 |

It will be noted from Table VII that at both 370° C. and 400° C. the hydrocarbon feed stock was completely consumed in upgrading the hydrogen to fuel gas. The heating values of the gaseous products are reported on the basis of a product gas free from five carbon atom and heavier hydrocarbons. These results represent an average increase in heat content of 144 percent as compared with the heating value of hydrogen alone. The heating values of the product gas are somewhat lower than the heating values obtained in Example 2 due to the higher hydrogen feed rates in Runs 4 and 5 as compared with Runs 1 to 3 of Example 2. In Runs 4 and 5, a 78 percent theoretical excess of hydrogen was charged to the reactor. As exemplified in Example 2, Runs 1 to 3, higher heat content product gas may be obtained by reducing the hydrogen feed rate relative to the rate of hydrocarbon feed. In theory, a stoichimetric amount of hydrogen would produce a fuel gas having a net heating value of 37 $MJ/m^3$.

It is evident from the foregoing that the process of this invention provides an effective method for the conversion of paraffin hydrocarbons containing five to 30 carbon atoms per molecule to gases consisting predominately of methane. The process provides a means for substantially increasing the heating value of hydrogen by conversion of hydrogen to methane and low molecular weight gaseous hydrocarbons by reaction with higher molecular weight normal paraffins, preferably having a boiling range betweeen 100° F. to 400° F. The hydrocarbon charge should contain less than 10 percent aromatic hydrocarbons by volume, preferably less than 5 percent aromatics by volume, and not more than 5 volume percent olefins. Olefins may be converted to paraffins by a hydrogen pretreatment as indicated in Example 3. For example, a petroleum derived feedstock comprising paraffins and olefins containing 5 to 30 carbon atoms per molecule may be pretreated in contact with a catalyst consisting essentially of crystaline aluminosilicate zeolite Y combined with 0.5 to 5 weight percent lanthanum and 0.5 to 5 weight percent cobalt wherein the mole ratio of cobalt to lanthanum is within the range of 0.5 to 5 at a temperature of about 300 to 450° F. and at a pressure in the range of 100 to 500 psig and a feed rate of 0.5 to 5 volumes of hydrocarbon feed per volume of catalyst per hour with hydrogen at a rate of 25 to 50 cubic feet per pound of hydrocarbon to effect saturation of said olefins.

The pressure at which the process is carried out should be within the range 4.5 to 70 bar (50 to 1000 psig), preferably 7.9 to 35.5 bar (100 to 500 psig) and the temperature should be within the range of 260° to 540° C. (500° to 1000° F.), preferably 315° to 455° C. (600° to 850° F.). The hydrocarbon charge rate should be within the range of 0.5 to 5 LHSV (volumes of liquid hydrocarbon per volume of catalyst per hour, and the hydrogen to hydrocarbon charge rate should be within the range of 1 to 5 standard cubic meters per kilogram (4 to 20 standard cubic feet per pound).

The preferred catalyst is zeolite Y associated with cobalt and lanthanum, each within the range of 0.5 to 5 weight percent and with a mole ratio of cobalt to lanthanum within the range of 0.5 to 5, preferably within the range of 1 to 3.

We claim:

1. A process for the production of methane from higher molecular weight paraffin hydrocarbons which comprises contacting a paraffin-containing petroleum derived feedstock consisting essentially of paraffins containing 5 to 30 carbon atoms per molecule and comprising not more than 10 percent by volume aromatic hydrocarbons and not more than 5 percent by volume olefinic hydrocarbons admixed with hydrogen with a catalyst consisting essentially of a crystalline aluminosilicate zeolite Y combined with 0.5 to 5 weight percent lanthanum and 0.5 to 5 weight percent cobalt wherein the mole ratio of cobalt to lanthanum is within the range of 0.5 to 5 at a temperature in the range of 500° to 1000° F. and at a pressure in the range of 50 to 1000 psig and a feed rate of 0.5 to 5 volumes of liquid hydrocarbon feed per volume of catalyst per hour to effect conversion of said hydrocarbon and hydrogen to gaseous hydrocarbons consisting essentially of methane.

2. A process according to claim 1 wherein the hydrogen feed rate is in the range of 1 to 5 standard cubic meters of hydrogen per kilogram of hydrocarbon feedstock.

3. A process according to claim 1 wherein the temperature is within the range of 600° to 850° F. and the pressure within the range of 100 to 500 psig.

4. A process according to claim 1 in which the mole ratio of cobalt to lanthanum is within the range of 1 to 3.

5. A process according to claim 1 wherein said catalyst includes lithium.

6. A process according to claim 1 wherein said catalyst includes cerium.

7. A process according to claim 1 wherein said hydrocarbon feedstock has a boiling range within the range of 100° to 400° F.

8. A process for the production of methane from higher molecular weight hydrocarbons which comprises contacting a petroleum derived feedstock comprising paraffins and olefins containing 5 to 30 carbon atoms per molecule with a catalyst consisting essentially of a crystalline aluminosilicate zeolite Y combined with 0.5 to 5 weight percent lanthanum and 0.5 to 5 weight percent cobalt wherein the mole ratio of cobalt to lanthanum is within the range of 0.5 to 5 at a temperature of about 300° to 450° F. and at a pressure in the range of 100 to 500 psig and a feed rate of 0.5 to 5 volumes of hydrocarbon feed per volume of catalyst per hour with hydrogen at a rate of 25 to 50 cubic feet per pound of hydrocarbon to effect saturation of said olefins, and thereafter passing the resulting hydrogen treated feedstock consisting essentially of paraffins containing 5 to 30 carbon atoms per molecule and comprising not more than 10 percent by volume aromatic hydrocarbons and not more than 5 percent by volume olefinic hydrocarbons and unconverted hydrogen into contact with a catalyst consising essentially of a crystalline aluminosilicate zeolite Y combined with 0.5 to 5 weight percent lanthanum and 0.5 to 5 weight percent cobalt wherein the mole ratio of cobalt to lanthanum is within the range of 0.5 to 5 at a temperature in the range of 600° to 850° F. and a pressure in the range of 100 to 500 psig to effect conversion of said hydrocarbon and said hydrogen to gaseous hydrocarbons consisting essentially of methane.

* * * * *